Patented June 25, 1929.

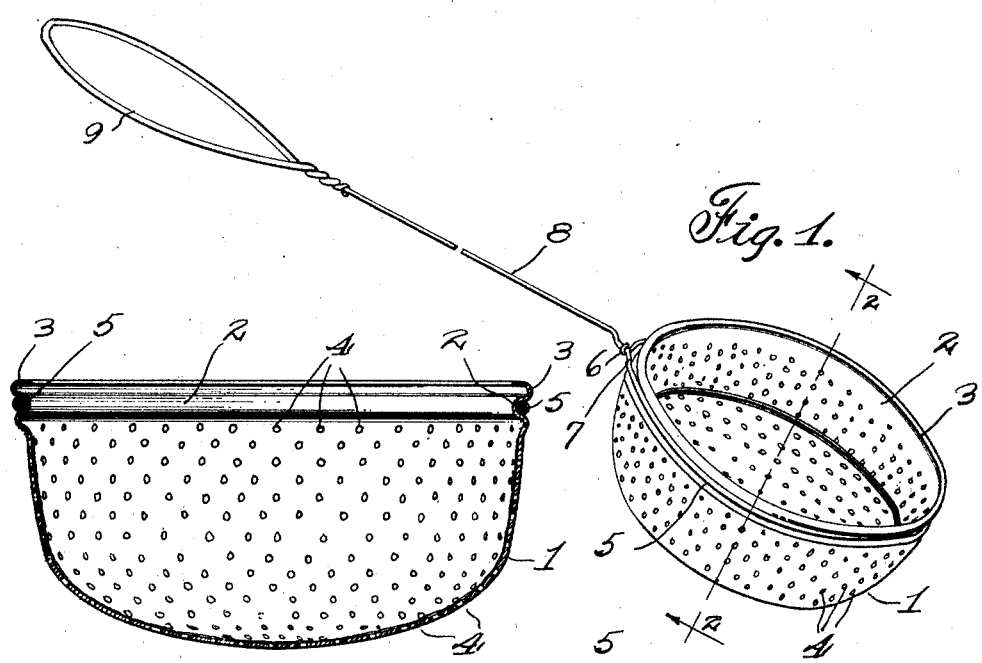
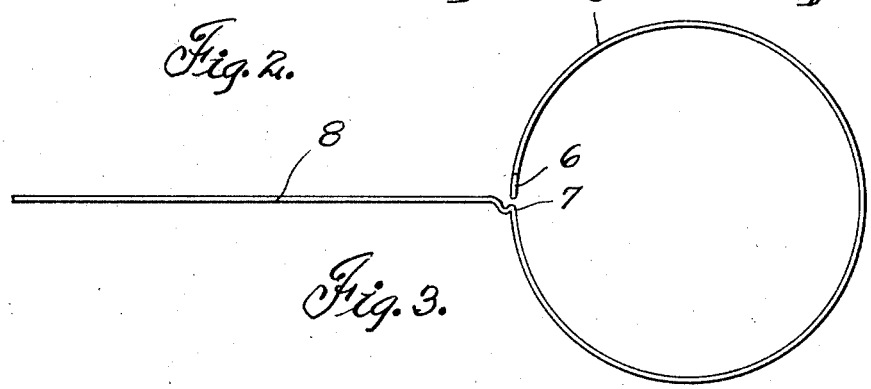
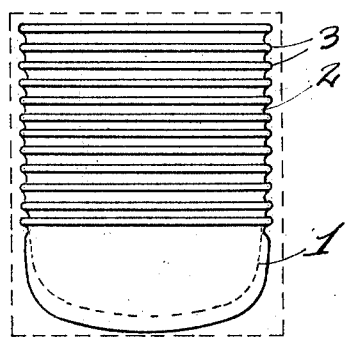

1,718,805

UNITED STATES PATENT OFFICE.

HARRY V. WILKIE AND ALBERT F. BACHERS, OF DETROIT, MICHIGAN.

INSECT TRAP.

Application filed June 22, 1927. Serial No. 200,522.

This invention relates to insect traps and the object of the invention is to provide a manually operated device for capturing insects such as flies, mosquitoes and the like.

One of the particular objects of the invention is to provide a cup shaped perforate paper member lined with a sticky substance and supported in a wire handle by which the insects may be captured by using the device similar to a fly swatter.

Another object of the invention is to provide a device of the character described lined with a sticky substance and adapted to be placed over an insect and in which the insect becomes enmeshed as soon as it starts to fly.

A further object of the invention is to provide a cup shaped paper member having a cushion edge adapted to be placed in contact with the wall over the insect to be captured.

Another object of the invention is to provide a series of cup shaped paper members lined with a sticky substance and so formed as to nest in a manner to prevent the different members from coming in contact and sticking together.

A further object of the invention is to provide a device of the character described in which the cup shaped paper members may be readily secured in or removed from the handle and may be readily disposed of after use.

These objects and the several novel features of the invention are hereinafter more fully described and claimed and the preferred form of construction by which these objects are attained is shown in the accompanying drawings in which—

Fig. 1 is a perspective view of an insect trap embodying our invention.

Fig. 2 is an enlarged section taken on line 2—2 of Fig. 1.

Fig. 3 is a plan view of the end of the handle in which the cup shaped paper member is secured.

Fig. 4 is a view illustrating the manner in which the cup shaped paper members are packed.

The device comprises a perforate paper cup 1 which is provided at the upper edge with an inwardly rolled annular bead 2 and and outwardly rolled annular bead 3 immediately thereover. The interior of the paper cup below the bead 2 is lined with a sticky substance similar to that used on ordinary fly paper and the sticky substance is applied so as not to fill up the perforations 4 in the paper cup. These perforations 4 are sufficiently small to prevent the escape of a fly or a mosquito therethrough, the openings being of about the size of the openings in the usual fly screen. These openings are sufficiently large and are placed sufficiently close together to allow a considerable volume of air to pass through the cup when it is swung by means of a handle so that an insect may be readily caught therein. The handle is formed of wire and comprises a loop 5 adapted to be engaged in the bead 2 as shown in Fig. 2 and this loop 5 is provided with a hook end 6 at one end adapted to engage in the opposite end 7 as will be understood from Figs. 1 and 3. In this manner the cup shaped paper member may be secured in the handle and the handle is provided with a straight shank 8 terminating in a return bent handle portion 9 shown in Fig. 1.

In use the operator grasps the handle 9 and uses the device similar to a fly swatter with the exception that the fly is not crushed when the cup shaped member is placed over it but in attempting to escape will become caught in the sticky substance with which the cup shaped paper member is lined. With this device flies may be caught on the walls and furniture without crushing the fly and leaving stains and spots on the walls and furniture. As the cup shaped paper member is lined with sticky substance below the bead 2 only there is no chance of the sticky substance coming in contact with the walls or furniture and the outer bead 3 provides a cushion edge for the device over the wire loop 5 to prevent the marking of the walls or furniture by preventing the wire loop from coming in contact therewith. With this device it is also possible to scoop the flies out of the air with a little experience and practice. The inwardly extending annular bead 2 being of smaller diameter than the perforate portion of the cup shaped paper member allows the paper members to be stacked or nested as shown in Fig. 4 without the sticky substance in one paper cup coming in contact with the adjacent paper cup and thus the cups may be packed for sale in a carton containing a dozen cups and a wire handle to be utilized therewith.

From the foregoing description it becomes evident that the device is very simple and efficient in operation, is of very low manufacturing cost, provides an efficient instrument for capturing insects and provides a device which accomplishes the objects described.

Having thus fully described our invention, its utility and mode of operation, what we claim and desire to secure by Letters Patent of the United States is—

1. An insect trap comprising a perforate cup shaped paper member having an inwardly extending annular bead formed adjacent the upper edge thereof, the portion of the cup shaped member below the bead being lined with a sticky substance, a handle having a wire loop adapted to be detachably secured in the said bead, the extreme outer edge of the cup shaped member terminating in an outwardly extending annular bead forming a resilient cushion over the wire loop.

2. In an insect trap, a perforate cup shaped paper member having an inwardly extending annular bead formed in the upper edge thereof, a handle having a wire loop adapted to engage in the bead of the cup shaped member to support the said member in the handle, the said cup shaped paper member being provided with an inwardly bent edge above the said loop forming a cushion.

3. An insect trap, comprising a perforate cup shaped paper member containing a sticky substance and having an inwardly extending annular bead formed in the upper edge thereof, and a handle having a wire loop adapted to engage in the bead in the cup shaped member.

4. In an insect trap, a perforate cup shaped paper member having an inwardly extending bead formed in the upper edge thereof, the cup shaped member being lined with sticky substance below the said bead, the said bead allowing the cup shaped members to be stacked together with the perforate portions containing the sticky substance in spaced relation.

5. An insect trap comprising a perforate cup shaped member of suitable material having a sticky substance on its interior surface, a handle member removably connected with the cup shaped member at a distance from its open end, said cup shaped member having a rim formed by turning the peripheral edge thereof inwardly to provide a cushion like portion for contacting the surface on which the insect may be found.

6. An insect trap comprising a perforate cup shaped member having a sticky substance in its interior surface, a handle member including a cylindrical portion engaging about the body of the cupped member below its open end, the peripheral edge of the cup member being outwardly bent and then inturned providing a resilient or cushion like rim portion beneath which the cylindrical handle portion engages and supporting the cup member from displacement in the striking of the device against the surface on which the insect may be found.

In testimony whereof we sign this specification.

HARRY V. WILKIE.
ALBERT F. BACHERS.